United States Patent [19]

Gonsoulin

[11] Patent Number: 4,909,159

[45] Date of Patent: Mar. 20, 1990

[54] AUTOMOBILE COMPUTER DESK

[76] Inventor: Don Gonsoulin, Rte. 2, Box 3504, Abbeville, La. 70510

[21] Appl. No.: 276,309

[22] Filed: Nov. 25, 1988

[51] Int. Cl.$^4$ .............................................. A47B 23/00
[52] U.S. Cl. ...................................... 108/44; 108/143
[58] Field of Search .................... 108/44, 143, 139; 312/235 A, 208, 196

[56] References Cited

U.S. PATENT DOCUMENTS

| | | | |
|---|---|---|---|
| 2,626,194 | 1/1953 | Clower | 108/143 X |
| 2,692,806 | 10/1954 | Grace | 108/143 |
| 3,031,242 | 4/1962 | Sawle, III | 312/235 A |
| 3,061,394 | 10/1962 | Whetstone | 312/235 A |
| 3,063,064 | 11/1962 | Mace | 108/44 |
| 3,606,112 | 9/1971 | Cheshier | 108/143 X |
| 3,632,158 | 1/1972 | Boothe | 108/44 X |
| 3,880,091 | 4/1975 | Heinonen | 108/44 |
| 3,922,973 | 12/1975 | Sturgeon | 108/44 |
| 4,494,465 | 1/1985 | Fick, Jr. | 108/44 |
| 4,648,574 | 3/1982 | Granlund | 108/103 X |

Primary Examiner—Peter A. Aschenbrenner
Attorney, Agent, or Firm—Pravel, Gambrell, Hewitt, Kimball & Krieger

[57] ABSTRACT

A support table for a desk top computer, which is positionable in the front seat of the automobile, adjacent the driver's seat, the apparatus comprising a horizontal support surface, so as to support a computer such as a desk top computer, a frame, supporting the surface; a pair of rear leg members, positionable along the rear wall of the frame, the lower ends of the leg members resting on the "passenger seat" of the automobile, and a pair of front leg members, along the front edge of the frame, the front leg members extending downward to rest on the floor of the automobile, the relative height of the front and rear leg members so as to provide a substantially horizontal support surface for the computer; and further including a slidable tray as a portion of the support surface upon which the computer sets.

9 Claims, 3 Drawing Sheets

AUTOMOBILE COMPUTER DESK

BACKGROUND OF THE INVENTION

1. Field of the Invention

The apparatus of the present invention relates to computer accessories. More particularly, the present invention relates to a table structure in relation to the seat of an automobile for supporting a desk top computer so that the driver may manipulate the computer while in the drivers seat of the automobile.

2. General Background

The widespread use of computers, more particularly the PC or desk top computers, have enabled users to utilize the computers in various settings such as offices, home libraries, or even in a more private setting such as a lap-top computer, wherein a person sitting in a very informal setting may operate the computer, for example during a meeting or the like.

In recent times, there appears an increase in the need for the use of a computer in an automobile, more particularly for a person such as a sales representative, who operates a great deal out of his automobile, and could in fact utilize a computer while the automobile is sitting in traffic or while one is parked during travel.

A review of the art indicates that there appears no type of a support structure which would enable a person in an automobile to have easy access to a computer in the front seat area of the automobile, so that easy manipulation of the computer could be undertaken. There were several patents which addressed tables which may be related to the present invention. For example U.S. Pat. 3,855,946 issued to Bales tells a pin adjustment in the leg of the table, which allows the legs to extend or retract as needed. However, the patent is not addressing the use of the table for the use of a support table for an automobile in supporting a computer.

U.S. Pat. No. 4,494,465 issued to Fich uses a table or desk designed to by utilized as a folding table attachable to the rear cargo area floor of a motor vehicle. Again, this fails to address the use of a table in the confines of the cab of an automobile.

SUMMARY OF THE PRESENT INVENTION

The apparatus of the present invention solves the problems in the state of the art in a simple and straight-forward manner. What is provided is a support table for a desk top computer, which is positionable in the front seat of the automobile, adjacent the driver's seat, the apparatus comprising a horizontal support surface, so as to support a computer such as a desk top computer, a frame, supporting the surface; a pair of rear leg members, positionable along the rear wall of the frame, the lower ends of the leg members resting on the "passenger seat" of the automobile, and a pair of front leg members, along the front edge of the frame, the front leg members extending downward to rest on the floor of the automobile, the relative height of the front and rear leg members so as to provide a substantially horizontal support surface for the computer. The apparatus further includes a pair of slots along the rear leg members for accommodating the seat belt of the passenger, which when threaded through the slots would secure the frame of the apparatus against the rear back portion of the passenger seat. It is also provided that the support surface be supported in the frame, and to further provide a computer support tray positioned to allow the sliding of the support tray in relation to the stationary support surface, so that the tray can slide forward to be positioned closer to the driver while the computer is set thereupon.

Therefore, it is a principal object of the present invention to provide a support table for a desk type computer which can be utilized in the front seat of an automobile;

It is a further principal object of the present invention to provide a support table for a desk top computer, which allows the support table to rest partially on the passenger seat, yet be maintained substantially horizontal in relation to the floor and the front seat of the automobile;

It is a further object of the present invention to provide a support table for a desk top computer which may be secured to rest partially on the front seat of the passenger side of an automobile, further including a tray means for moving the computer adjacent to or away from the driver as the need requires.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

FIGS. 1-6 illustrate the preferred embodiment of the apparatus of the present invention by the numeral 10.

Figure 1:
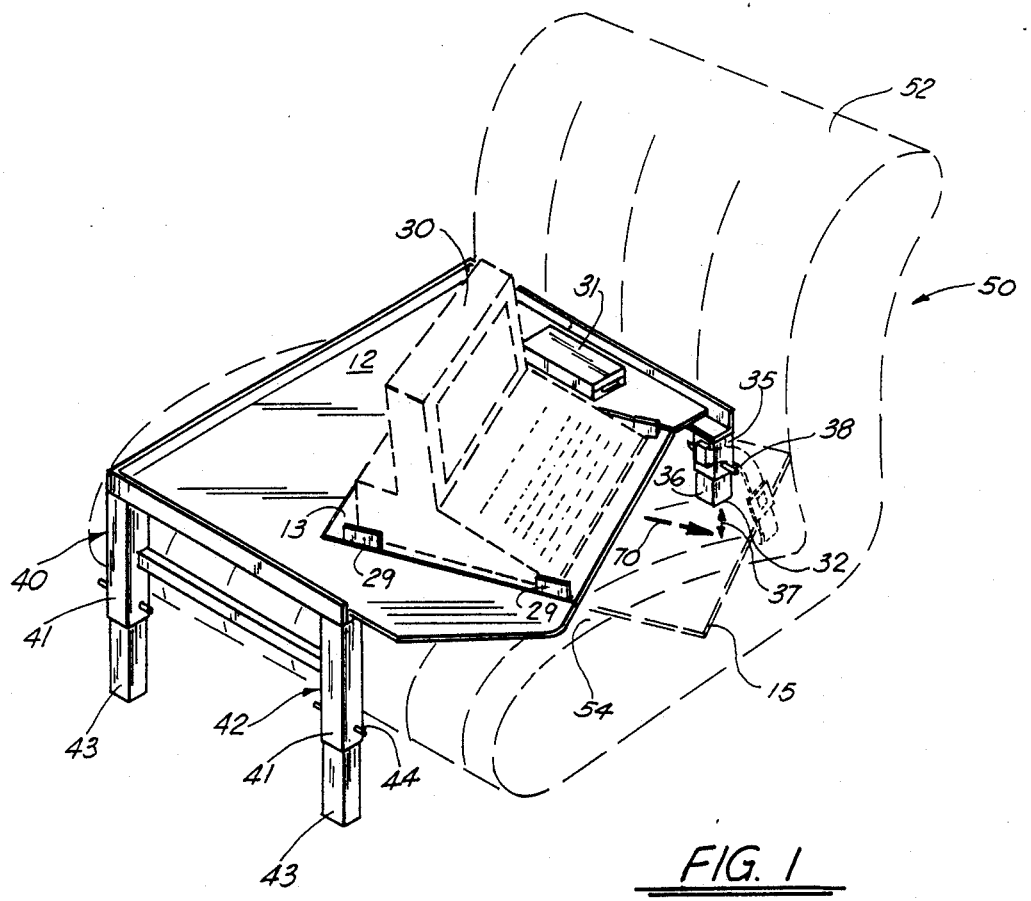
FIG. 1 is an overall perspective view of the apparatus of the present invention.
Figure 2:
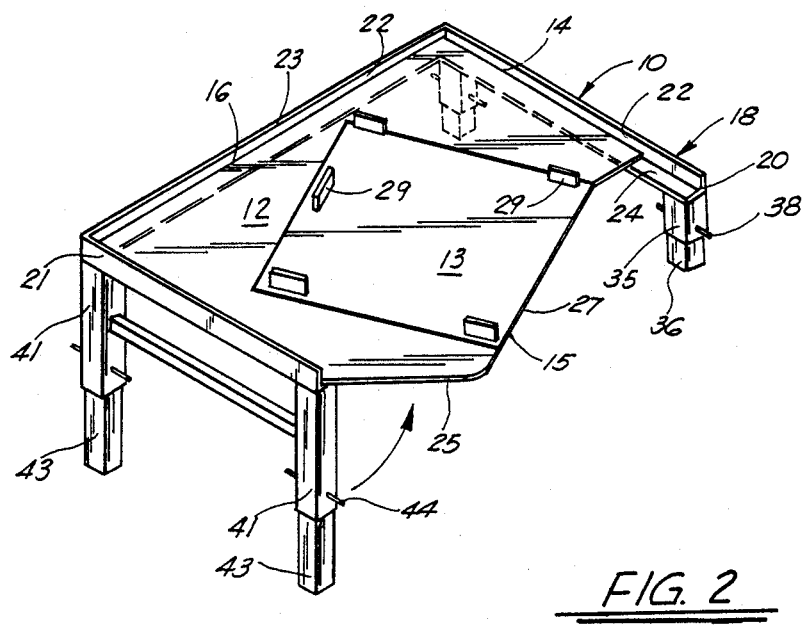
FIG. 2 is an overall perspective view of the apparatus of the present invention partially secured to the passenger seat of an automobile.
Figure 3:
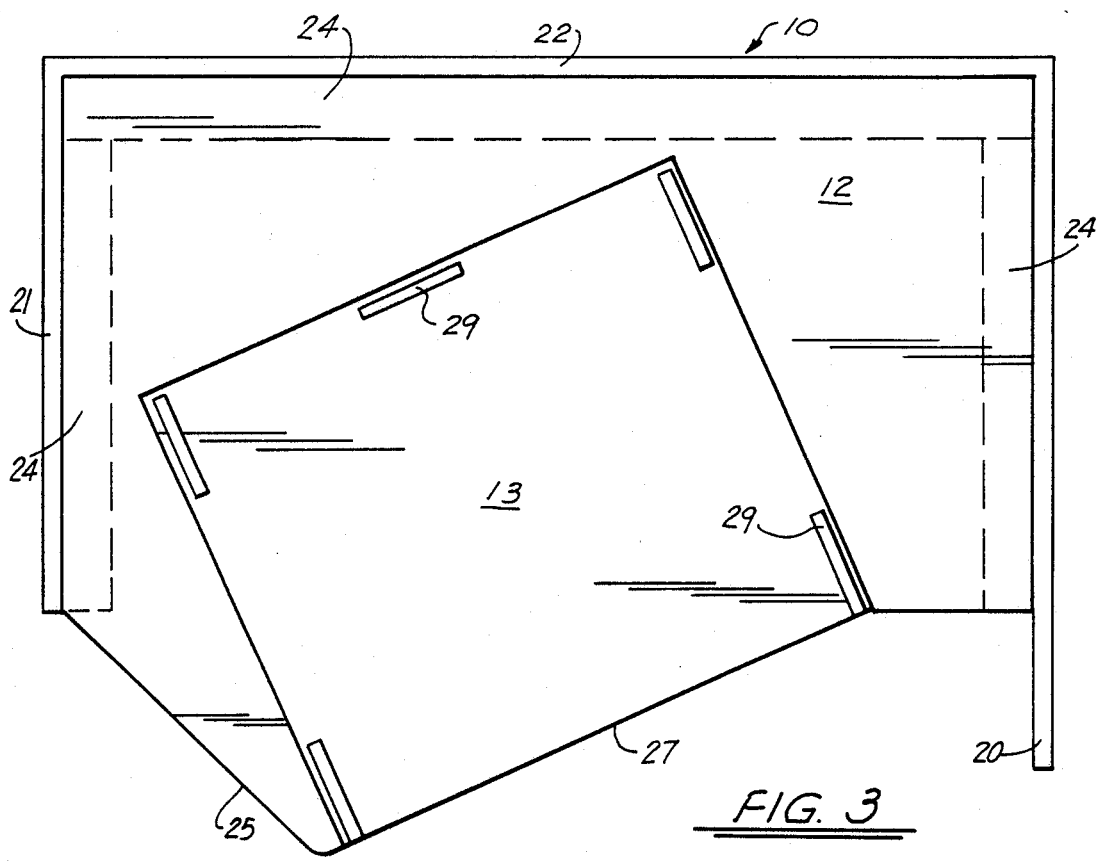
FIG. 3 is a top view of the preferred embodiment of the apparatus present invention.

As illustrated in the FIGURES, more particularly FIGS. 1 and 2, apparatus 10 would include a substantially horizontal computer support surface 12, having a pair of side edges 14, and a rear edge 16. The side edges 14 and rear edge 16 are supported by a frame 18. Frame 18 would include a first side horizontal frame member 20, a front side frame member 21, and an intermediate frame section 23, each of the frame members 20, 21, and 23 including a vertical side wall 22, and a horizontal floor supporting frame member 24. The frame, substantially defines a U-shaped frame wherein the edges 14 of support surface 12 rest in fixed position on each of the horizontal support members 24 as illustrated to provide a stationary surface 12. The frame 18 would be open ended towards the drivers seat, with the front angular edges 25 and 27 of support surface 12 being opened towards the driver as illustrated in FIGS. 1 and 2. Support surface 12 would further include a computer support tray means 13, having a plurality of upright members 29 positioned in a substantially rectangular fashion, so as to support a table top or desk top computer 30 (as illustrated in phantom view in FIG. 2), the upright members 25 defining a means for preventing desk top computer 29 from shifting relative to the its position on support surface 12 during use of the item.

Figure 6:
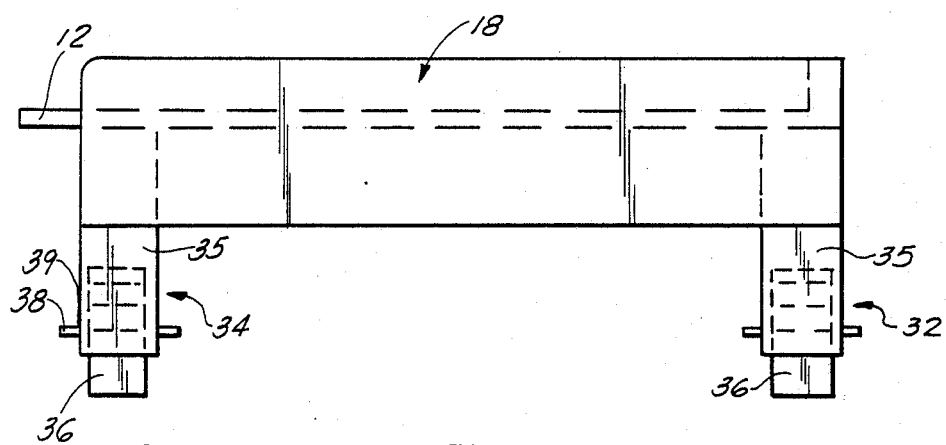
FIG. 6 is a rear view of the preferred embodiment of the apparatus of the present invention.

As illustrated in the FIGURES, apparatus 10 would further include a plurality of four leg members, with a pair of rear leg members 32 and 34, and a pair of forward leg members 40 and 42 respectively. As illustrated, rear leg members 32 and 34 would comprise a first upper portion 35, attached to the underside of horizontal support surface 24 of frame rail 20, at either end. Upper box portion 35 of leg 32 would further include a lower leg portion 36, which would be slidably engaged within an upper frame portion 35 so as to allow adjustability of the rear leg in the direction of arrows 37 as illustrated in FIG. 2. As is illustrated there is further provided a horizontal pin member 38, which extends through a bore of upper leg member 35, and would likewise extend to a bore in lower leg portion 36 in order to position leg 36 at the proper height during use. As is illustrated in FIG. 6, upper portion 35 would include a plurality of ports 39, which would mate with a plurality of ports in lower leg portion 36 during use. Therefore, the rear legs, could be adjustable depending on the type of automobile that the apparatus would be positioned upon.

Turning now to front leg members 40 and 42, front leg members 40, 42 would likewise include an upper leg portion 41, the upward side of which would be secured to the lower face of front frame member 14, at either end thereof in order to provide the front legs for the apparatus. As illustrated upper portion 41 likewise slidably accommodates a lower portion 43 again so as to provide adjustability to the front legs 40, 42, the reason as will be explained further. In order for lower portion 43 to be properly secured with relative to upper box portion 41, again there is provided a plurality of ports 45 within the walls of lower leg portion 43 and upper leg portion 41, so that when the ports are aligned, a pin member 44 may be extended through the ports, so as to firmly secure the lower leg portion 42 to the upper leg portion 41 at the desired height.

Figure 4:
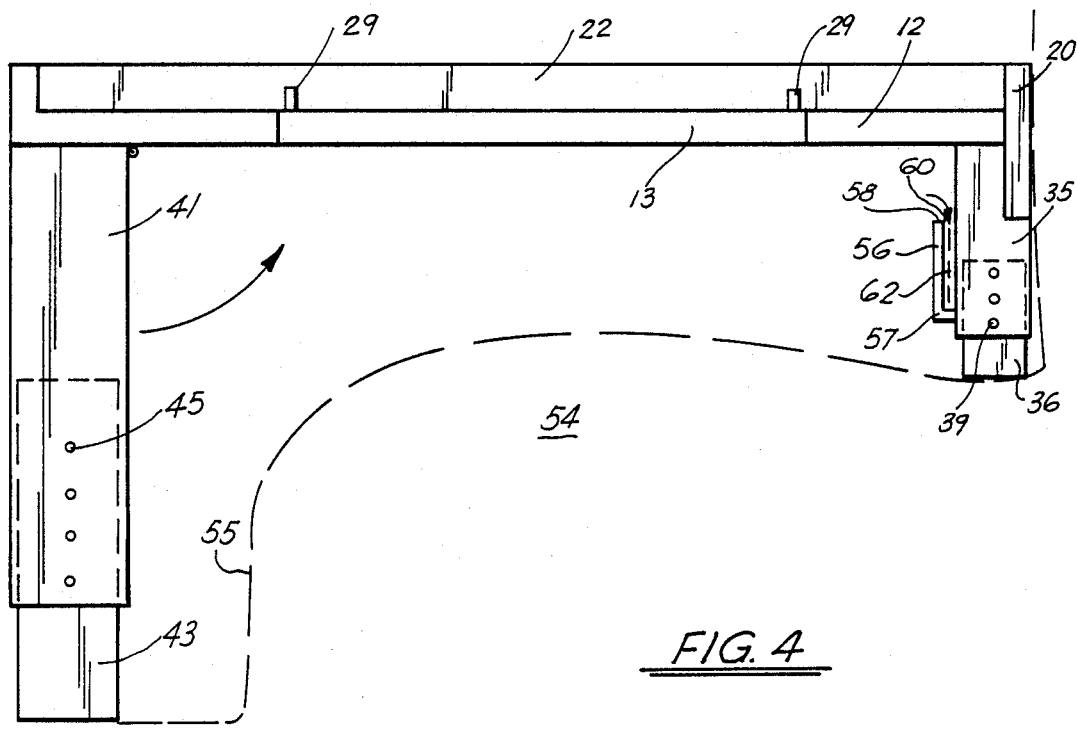
FIG. 4 is a side view of the apparatus of the present invention partially resting on the passenger seat of an automobile.
Figure 5:
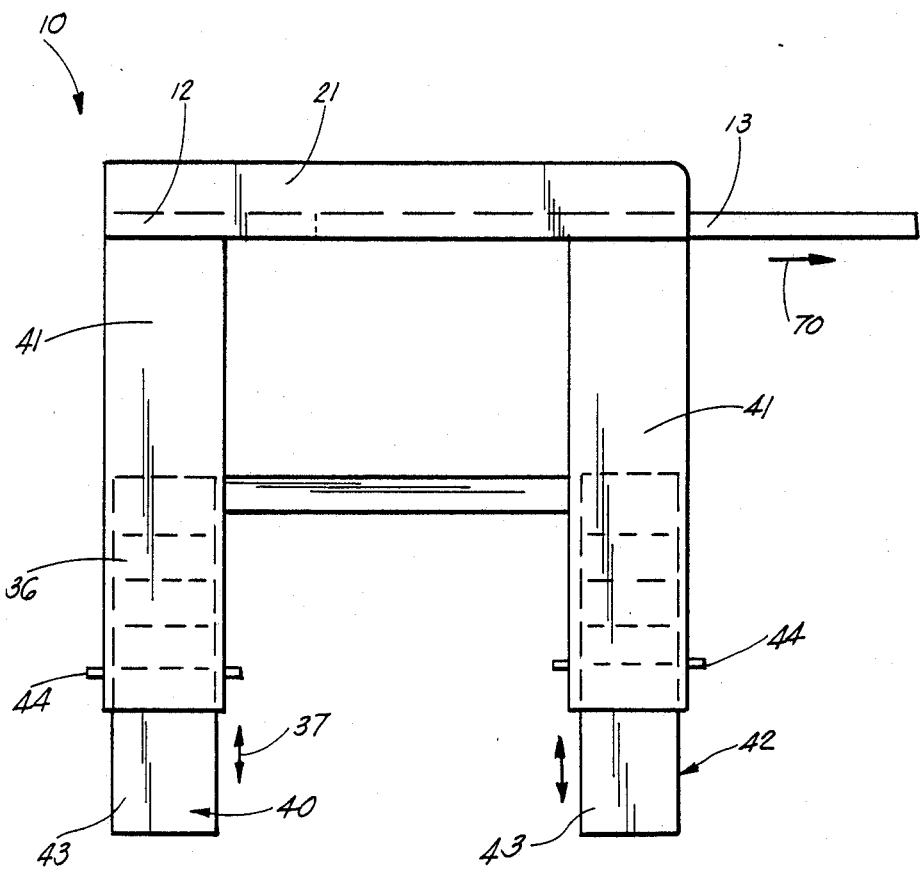
FIG. 5 is a front view of the preferred embodiment of the apparatus of the present invention.

Turning now to the reason for the adjustability of the rear legs and the forward legs, reference is made to FIGS. 2 and 4, where there is illustrated a car seat 50 having a back portion 52, and a seat portion 54. In utilizing apparatus 10, and reference is made to FIG. 4, the rear legs 32, 34 of the apparatus would be substantially shorter than the front legs 40, 42, in view of the fact that the rear legs would rest upon the seat 54 and the automobile, with the rear wall 22 of rear frame member 20 substantially in flat contact with the surface of back portion 52 of seat 50. This of course would enable the rear wall of the apparatus to be stabilized along the length of frame portion 20 as it is engaged against seat 52.

As illustrated in FIGS. 2 and 4, the width of support surface 12 would provide that support surface 12 extend a distance beyond the forward wall 55 of seat 54. In order to assure that the surface 12 is horizontal, front legs 40, 42 would therefore have to be of a greater length than rear legs 32, 34, since the front legs would have to extend from the lower surface of support surface 12 down to the floor 55 so as to again provide for the horizontal position of support surface 12 when desk top computer 30 is placed thereupon.

Apparatus 10 would further provide a means for insuring that the apparatus if secured against the rear seat 52 there in use. Turning now to FIG. 4, this means would include a pair of bracket members 56, secured to the front wall of the rear upper leg portions 35 having a vertical support portion 57 secured to the wall of leg portion 35 and a horizontal support portion 57 secured to the leg portion 35 and a vertical support portion 58 extending upwardly therefrom, for defining a channel 60 wherein a length of seat belt 62 may be slidably engaged. Therefore, the seat belt 62 is slidably engaged into each the brackets 56, and would then be buckled as in its normal pattern, and therefore that would insure that the apparatus is pulled securely against the upper back seat 52 while the apparatus is present in the automobile.

Furthermore, as is illustrated in FIGS. 1 and 2, due to the nature in which the support surface 12 is secured stationary to the frame, wherein the edges 14 of the support surface 12 is secured onto the horizontal floor portion 24 of each of the three frame members, the support surface further provides that the computer support tray means 13, as was referred to earlier, provides a means for allowing the computer 30, resting on the support means 13, to have the ability to move between a first rearward position as illustrated in FIG. 2, with the forward edge 15 of tray means 13 flush with the front edge 25 of support surface 12, to a second forward position, as illustrated in phantom view in FIG. 1, so that the computer 30 resting on the tray 13 may be moved forward to a position which would be adjacent the driver of the automobile so that the driver may operate the computer in an easier fashion. When the operation of the computer is complete, the tray may be slid rearward to position as seen in FIG. 2, to move the computer out of the driver's way. As illustrated further, in FIGS. 1 and 2, due to the fact that the tray means 13 is a smaller rectangular portion of the overall support surface 12, one is able to utilize the area surrounding the support surface 12 as a further means for accommodating other items such as a hard disk drive 31 as seen in FIG. 1. The manner in which the tray means 13 would be slidably engaged to the support surface 12 may be the manner in which a typical desk drawer or the like slides rearward and forward on a metal track or through the use of other suitable means.

For purposes of construction, the apparatus may of course be of lightweight construction of wood or the like material, and due to the adjustability of the leg portions, the apparatus could be utilized in just about any type of automobile, wherein there is a seat portion and a floor portion in front of the seat portion for providing that once the rear and front legs have been adjusted, the apparatus would be in substantially horizontal position, for use with a computer.

Further, in order to more easily store the table when not in use, the leg members of the table may be hingedly engaged to the support surface 12, so as to allow the leg members to fold inwardly beneath the support surface 12, so that the table may be placed in a trunk of an automobile or the like.

Although the principal would include an apparatus having four legs which are supported next to the driver's seat, it is foreseen that in certain instances a driver of the vehicle may not have a seat adjacent to him, for example, a delivery truck, and yet may still wish to have such a support table for a computer. Therefore, in that instance, it is foreseeable that the same support structure would be used with the sliding top portion on such a table, yet rather than have the four legs, the apparatus would supported by, for example, a pedestal, positioned on the floor adjacent the driver, so that the driver may have access to the computer, for use.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A table for supporting a desk or lap computer, the vehicle of the type having a seat adjacent the driver's seat, the apparatus comprising:
   (a) a support frame, having a pair of side frame members and a rear frame member interconnecting the side frame members;
   (b) a support surface, extending and supported by the support members, the support surface comprising a tray means slideable from a first position so that the forward edge of the tray means is flush with the forward edge of the support surface, and a second position wherein the tray means is slideably moved forward of the support surface and closer to the driver's seat;
   (c) at least one rear leg member, positioned upon the rear portion of the passenger seat of the vehicle;
   (d) at least one front leg member, supporting the frame, and extending downward to be supported on the floor of the vehicle; and
   (e) means for changing the length of the rear and front leg members, so that the support surface is maintained substantially horizontal in relation to the floor of the vehicle, while a computer is positioned thereupon and
   (f) bracket means positioned on the support frame for securing the table to the seat with the use of a seat belt.

2. The apparatus in claim 1, wherein there is further included a plurality of upright members positioned on the tray means of the support surface for preventing the movement of a computer placed upon the tray means.

3. The apparatus in claim 1, wherein the front leg and rear leg members further include lower leg portions slidably engaged in upper leg portions, so that the extending and retraction of the slideable portions of the leg members serves as a means to maintain the support surface in a substantially horizontal position in relation to the floor of the vehicle.

4. The apparatus in claim 1, wherein the tray means is slidably moveable, so that the computer may be moved to a position closer to the driver of the vehicle.

5. The apparatus in claim 1, wherein the slideable leg portions are engaged into the upper leg portions by the use of a pin member engaged into the wall of each of the leg members.

6. A table for supporting a lap-type computer in a vehicle, so that the computer is supported adjacent the driver of the vehicle, the table comprising:
   (a) a support frame, including a pair of parallel side frame members, and a rear frame member interconnecting the pair of side members;
   (b) rear legs attached to the underside of the first side frame member, the rear legs being positioned on the seat of the automobile adjacent the driver;
   (c) at least one forward leg, said forward leg being attached to the underside of the second side frame member, the forward leg extending downward between the underside of the second side frame member and the floor of the vehicle;
   (d) a support surface, extending between and supported by the pair of frame members, the support surface serving as a means for placing a computer thereupon;
   (e) the support surface comprising a tray means, the tray means being slidably movable between a first rear position, to a second forward position, so that the computer may be moved closer to the driver when the tray means is in the second position, and may return to the first position after use;
   (f) means working in cooperation with the rear and forward leg members, for extending and retracting the rear and forward leg members so that the support surface is maintained in a substantially horizontal position in relation to the floor of the vehicle; and
   (g) bracket means on the support frame for securing the table to the seat with the use of a seat belt.

7. The apparatus in claim 6, wherein the tray means is slidably attached to the support surface via a pair of track members sliding thereupon.

8. The apparatus in claim 6, wherein the forward and rearward legs are attached to the underside of the side members of the frame via hinges or the like.

9. The apparatus in claim 6, wherein the bracket means comprises a pair of brackets, each bracket secured upon a rear leg of the apparatus for allowing the seat belt to be housed therethrough and fix the rear legs firmly against the rear of the seat.

* * * * *